Aug. 20, 1946.                G. GARNIER                2,406,214
      CLEANER FOR COMPRESSED AIR ARRANGED FOR AUTOMATIC DRAINING
                        Filed Aug. 8, 1945
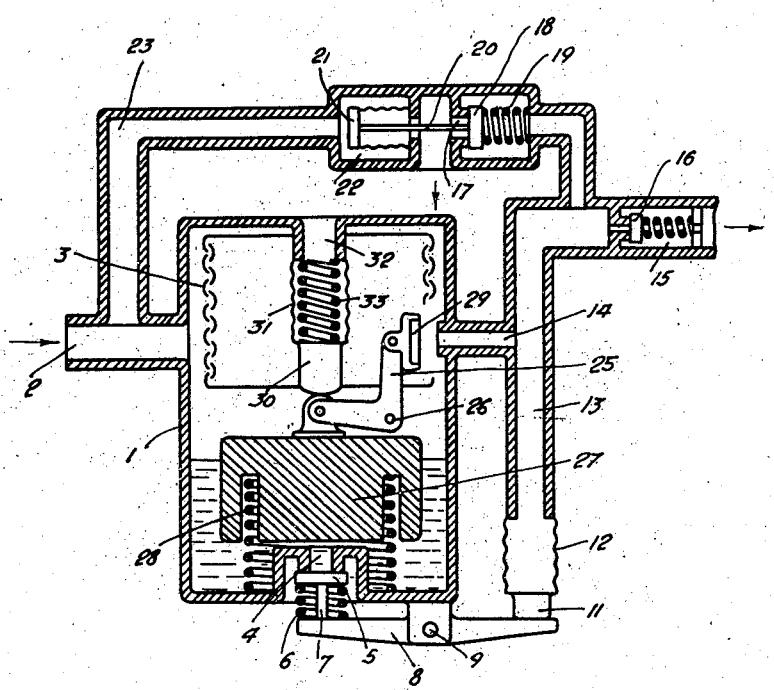

Patented Aug. 20, 1946

2,406,214

UNITED STATES PATENT OFFICE 2,406,214

CLEANER FOR COMPRESSED AIR ARRANGED FOR AUTOMATIC DRAINING

Georges Garnier, Paris, France, assignor to Air-Equipment, Paris (Seine), France, a French company Application August 8, 1945, Serial No. 609,681
In France August 10, 1943

4 Claims. (Cl. 183—39)

My present invention relates to cleaners or purifiers for compressed air wherein the liquid accumulated in the lower part of the apparatus is automatically drained off as soon as it has reached a predetermined level. To that effect, use has been for example already made of a cock or other valve adapted to close a draining port controlled by a float which eventually can be associated with some suitable relay capable of magnifying the effort of the float, the latter being too small to ensure direct control. For opening a draining valve, use has also been made of the overpressure as generated in the cleaner by the closure of the air outlet by means of a float-actuated valve.

A disadvantage of these known devices is that it is difficult to provide a float (hollow body) capable of withstanding in the long run such pressures as prevail within the apparatus. Another disadvantage of said devices wherein the draining valve is controlled responsive to the fluid level resides in their inability to keep the draining valve open for a sufficiently long time to drain off the whole of the liquid which has collected in the apparatus. In other devices the re-opening of the closing valve for the air-draining port does not take place in certain cases or occurs prematurely in other cases.

The invention aims at obviating the aforesaid disadvantages and includes for that purpose several constructional improvements which can be used either separately or in combination.

One of such improvements resides in the fact that, in addition to receiving a thrust from the liquid, the member which is dipped into said liquid and whose motion controls a device for initiating the drainage also supports an elastic thrust and, moreover, said member is so arranged that its weight will remain higher than the sum of said two thrusts, at least as long as the liquid level has not substantially reached that predetermined limit for which draining should take place.

This arrangement makes it possible to form the control member dipped into the liquid as a resistent block (for example a solid block) such as will withstand crushing stresses due to the air pressure prevailing in the apparatus. Furthermore, its displacement should be considerably smaller than the variation of liquid level.

Another improvement, utilisable preferably in combination with the above-stated improvement or else independently therefrom, is that the draining port cooperates with a closing valve which is opened responsive to the over-pressure which is generated in the cleaner when its outlet port is closed, and said valve is urged to a position closing said draining port by a pressure-responsive member and subjected to the pressure prevailing in an enclosure communicating with the inside of the cleaner through a port (for example the air outlet port for the cleaner) which can be closed by a valve controlled by the member immersed in the liquid.

The above-stated arrangement is advantageously completed by a device for accelerating the opening of the draining valve responsive to a reduction of the stress that urges it to closed position, said device comprising for example for that purpose a vent providing communication between said enclosure and the outer atmosphere, said vent being closable by a valve urged to closed position by a weak spring and by the pressure in said enclosure and conversely to open position by a member responding to the pressure inside the cleaner and having a sectional area substantially equal to that of said draining valve.

In order to ensure a safer closure of the draining port on completion of the drainage, it is also advantageous, according to a further improvement embodied in the invention, and capable of being used independently of the aforesaid improvements, to provide a device for opening the cleaner outlet closing valve, said device being urged in the opening direction of said valve by a spring and in the reverse direction by a force dependent upon the pressure prevailing in the cleaner, so that the spring action should become predominating for a value of said pressure lower than the normal operative pressure.

The accompanying drawing which comprises only one figure shows by way of non-limitative example a suitable constructional form of the cleaner embodying all the aforesaid improvements.

In this constructional form, the cleaner or purifier comprises a cylindrical body 1 provided with an inlet port 2 for the compressed air which must be cleaned and containing a device 3 for separating the liquid particles carried by the air flow, such device being of known type and forming per se no part of the invention. The lower part of the body 1 in which the liquid as separated by the device 3 is collected is provided with a draining port 4 closable by a valve 5 urged to closing position by a weak spring 6 and by a plunger 7 upon which operates one arm of a two-armed lever 8 pivoted at 9 to the body 1 and having its other arm in contact with a plunger 11 carried by a bellows 12 whose sectional area is considerably larger than that of the draining port 4. The internal space defined by said membrane 12 communicates with an enclosure 13 into which terminates a port 14 through which the cleaned air flows out of the body 1 and whence a distributing duct 15 for the cleaned air extends, said duct having interposed therein a non-return valve 16. A port 17 formed in the wall of the enclosure 13 communicates with the outer atmosphere and is closed by a valve 18 arranged inside said enclosure and urged to closing position by a weak spring 19. In the reverse direction, said valve is acted upon by a rod 20 carried by a bellows 21 housed in a chamber 22 which communicates through a duct 23 with the inlet port 2 for the compressed air to be cleaned. The sectional area of the bellows 21 is substantially equal to that of the valve 18. Inside the body 1 is arranged a cranked lever 25 fulcrumed on a pin 26 and having one of its arms pivoted to a lifting member 27 adapted to be immersed in the liquid which gathers in the lower part of the apparatus. Such lifting member comprises a block which is acted upon in a direction reverse to that of its weight by a spring 28. The other arm of the lever 25 carries a valve 29 capable of closing the outlet port 14 for the cleaned air upon the member 27 being lifted. Above and in vertical alignment with the lifting member 27 is arranged a contrivance for driving said member downwardly and for opening the valve 29. This contrivance comprises a plunger 30 carried by a bellows 31 the inner space of which communicates with the outer atmosphere through a port 32 and accommodates a spring 33 the tendency of which is to extend said bellows.

The operation is as follows:

At rest, assuming the cleaner to be empty of any liquid and sealed off the source of compressed air, the draining valve 5 is closed by the spring 6, the lifting member 27 occupies its lower position so that the valve 29 is open, while the bellows 31 is extended to the utmost by the spring 33 and the valve 18 is closed by its spring 19. When now compressed air is admitted through the inlet port 2, the pressure also rises inside the body 1 and inside the enclosure 13. As the sectional area of the valve 18 is equal to that of the antagonistic bellows 21, it follows that the valve 18 remains closed. Therefore the draining valve 5 is more strongly applied against its seat responsive to the action of the pressure inside the enclosure 13 on the membrane 12 since its sectional area is larger than that of the draining port 4. The air cleaned by the device 3 flows through the outlet port 14 and through the non-return valve 16 along the distributing duct 15. Moreover the bellows 31 is compressed by the pressure which now prevails inside the body 1, so that the plunger 30 is moved off the member 27. The liquid separated from the air by the device 3 gathers in the lower sump part of the body 1 and more and more immerges the lifting member 27, thus exerting upon it an increasing upward pressure. Consequently the spring 28 lifts the member 27 little by little to an extent determined by this apparent lightening, whereby for a determined level assumed by the liquid this lifting action closes the valve 29 controlling the outlet port 14 for the cleaned air. The pressure then rises inside the body 1 and also in the duct 23 and in the chamber 22 but not in the enclosure 13. The difference between the sectional area of the draining port 4 and that of the bellows 12 keeps the valve 5 closed in spite of this discrepancy of pressures in the body 1 and enclosure 13. However, the thrust on the bellows 21 rises to a value higher than that which is exerted upon the valve 18 the sectional area of which is equal to that of the bellows but accommodated in the enclosure 13 where a lower pressure prevails, so that the rod 22 opens the valve 18, thereby providing communication between the enclosure 13 and the outer atmosphere through the port 17. Therefore the pressure rapidly drops inside the enclosure 13 and the establishment of that difference of pressure necessary for opening the draining valve 5 is hastened. As this valve is opened, the liquid is driven outwardly. When open, the valve 5 has a tendency to remain open, the spring 6 being insufficient for ensuring its closure as long as the body 1 is under pressure. This permits the drainage to be fully completed. As soon as it is completed, air escapes through the draining port 4 so that the pressure drops in the body 1 but this pressure drop is not sufficient to enable the non-compensated fraction of weight of the lifting member 27 alone to open the valve 29 against the remaining pressure. However such pressure drop is sufficient to enable the spring 33 to become extended while elongating the bellows 31 and to push or drive the member 27 through the medium of the plunger 30 connected to the bellows 31. As soon as the valve 29 is open, equality of pressure is resumed in the enclosure 13 and body 1 so that the draining valve 5 is immediately closed under the action of the bellows 12. Simultaneously the valve 18 undergoes equal thrusts owing to the re-establishment of equal pressures in the chamber 22 and enclosure 13 and to its sectional area being equal to that of the bellows 21, so that it is brought back to closed position by its own spring 19.

It will be understood that the invention is by no means limited to the constructional details as described and shown, these being given as a mere exemplification. Thus for instance the lever 8 might have unequal arms, in which case the bellows 12 might not have a larger sectional area than that of the draining port. Similarly the port providing communication between the cleaner and the enclosure ensuring closing of the draining valve might be separate from the air outlet for the cleaner and might cooperate with a valve distinct from that which cooperates with the outlet, these two valves being however still controlled by the same member 27. Again the device for forcing the air outlet valve to open position might be provided independently of the other improvements as above described without departing from the ambit of the invention.

What I claim is:

1. A device for purifying compressed air and draining the liquid separated therefrom comprising a casing, means for feeding compressed air thereto and removing it therefrom, an auxiliary compartment adapted to receive compressed air from the casing, purifying means inside the casing, a drain valve at the lower part of the casing, a passage including an outlet valve between the casing and the compartment, a weighted member adapted to be immersed in the liquid collecting in the lower part of the casing and to control the opening of the outlet valve, means submitted to the action of the fluid pressure beyond the outlet valve in the auxiliary compartment and adapted to control the drain valve and yielding means acting on the weighted member together with the upward thrust of a minimum amount of liquid at the bottom of the casing for reducing the apparent weight of said member and causing it to rise and operate the closing of the outlet valve whereby the fall in pressure beyond the outlet valve is adapted to open the drain valve.

2. A device for purifying compressed air and draining the liquid separated therefrom comprising a casing, means for feeding compressed air thereto, an auxiliary compartment adapted to receive compressed air from the casing, purifying means inside the casing, a drain valve at the lower part of the casing, a passage including an outlet valve between the casing and the compartment, a weighted member adapted to be immersed in the liquid collecting in the lower part of the casing and to control the opening of the outlet valve, a member controlling the drain valve, means whereby the pressure in the auxiliary compartment is adapted to act on last mentioned member through an operative surface of larger area than the operative cross-section of the drain valve, yielding means adapted to raise the weighted member in cooperation with the upward thrust of the liquid collected in the casing whereby the weighted member closes the outlet valve for a predetermined level of collected liquid and means whereby the closing of the outlet valve increases the difference in pressure between the casing and the auxiliary compartment to a value which urges the member controlling the drain valve into its draining position.

3. In a device as claimed in claim 1, the provision of complementary means urging the drain valve into its open position comprising a valved communication between the auxiliary compartment and the atmosphere, a light spring urging the valve of said valved communication into its closed postion and a piston submitted to the pressure inside the casing and acting in the opposite direction, the operative cross-sections of said piston and of last mentioned valve being substantially equal.

4. In a device as claimed in claim 1, the provision of a complementary device for opening the outlet valve, comprising a spring adapted to urge the weighted member into its lower position in antagonism with the pressure inside the casing, the action of the spring predominating when the pressure has fallen below normal in the casing after the draining is complete.

GEORGES GARNIER.